Sept. 10, 1957 J. K. HILEMAN 2,805,799
COFFEE DISPENSING MECHANISM
Filed April 23, 1954

INVENTOR.
James K. Hileman
BY Jaspert & Camby
Attorneys

2,805,799
COFFEE DISPENSING MECHANISM
James K. Hileman, Confluence, Pa.
Application April 23, 1954, Serial No. 425,120
1 Claim. (Cl. 222—362)

This invention relates to new and useful improvements in coffee dispensing mechanism, more particularly to a dispenser for use with vacuum packed coffee to maintain the coffee in a substantially sealed atmosphere after the can has been opened.

Substantially all vacuum packed ground coffee is sold in cylindrical containers as so-called vacuum packed coffee to maintain the aroma and flavor of the ground coffee that would otherwise become rancid and stale if exposed to the atmosphere. No provision has been made for preserving the contents of the vacuum packed can after the can is once opened so that the contents will not deteriorate.

In accordance with the present invention I provide a dispensing mechanism in the shape of a hopper which is attached to the open portion of the can to maintain an effective seal from the atmosphere; also to provide for dispensing regulated amounts of the coffee without the use of additional measuring devices.

It is therefore among the objects of the invention to provide a coffee dispensing device which can be attached to the conventional vacuum packed coffee can for measuring off known quantities of the coffee and for maintaining the unsued portion of the coffee in a dry and unexposed atmosphere.

The invention will become more apparent from a consideration of the accompanying drawing, constituting a part hereof, in which like reference characters designate like parts, and in which—

Figure 2:
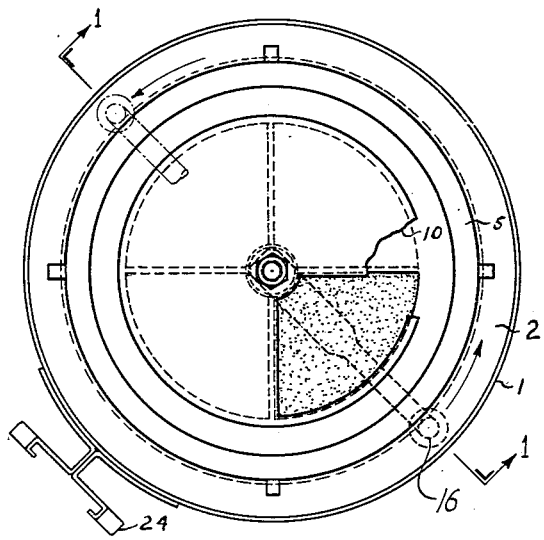
Figure 2 is a top plan view of a portion of the container and dispenser with the cover removed.

With reference to the several figures of the drawing, the numeral 1 designates a metal container, such as is commonly used in the sale of vacuum packed ground coffee. The numeral 2 designates a ring having fingers 3 for crimping over the beaded end of the coffee can 1 after the bottom has been cut out. A hopper-like member 4 of conical shape is suspended from the ring 2 by a flange 5 that rests upon the ring 2 as shown in Figures 1, 2 and 3.

Figure 5:
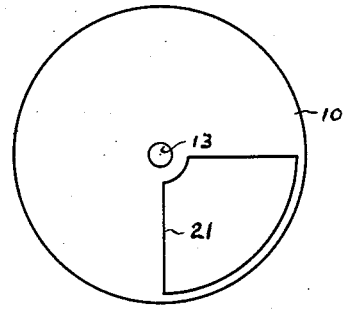
Figure 5 is a top plan view of a partition member used in the dispensing device.

Mounted in the hopper portion 4 is a doubled flanged annulus 7 which is attached to the hopper 4 by lugs 8 and 9 to suspend the same in the hopper. A pair of identical discs 10 and 11, such as shown in Figure 5, are secured to a sleeve 12, the discs being provided with bores 13 for receiving a bolt 15 that is provided with a crank 16 to rotate the same through an arc of 180° as shown by the dotted lines in Figure 2 of the drawing.

Figure 3:
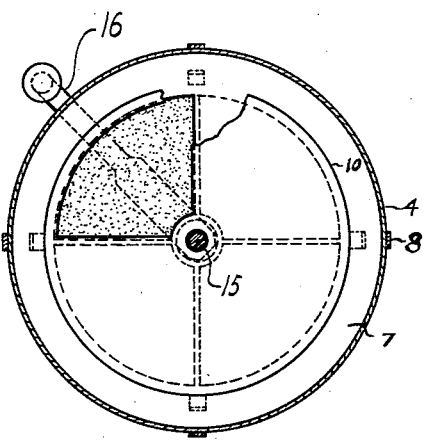
Figure 3 is a top plan view, partially in section, taken along the line 3—3, Fig. 1.
Figure 1:
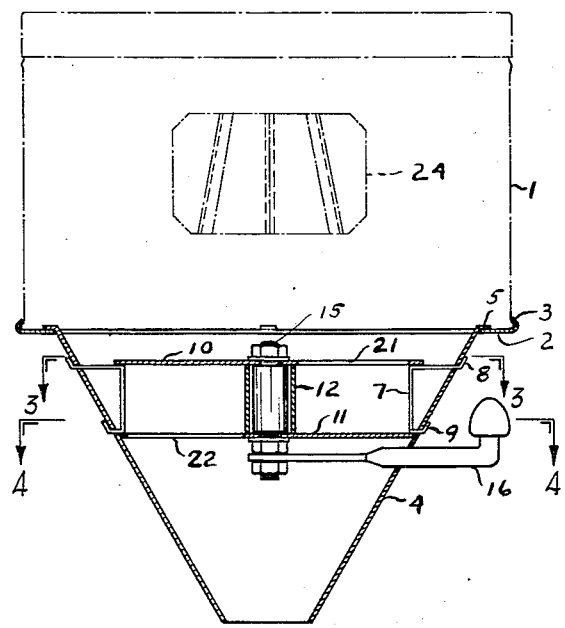
Figure 1 is a vertical cross-sectional view, partially in elevation, of a coffee dispensing device attached to a coffee container, embodying the principles of this invention.
Figure 4:
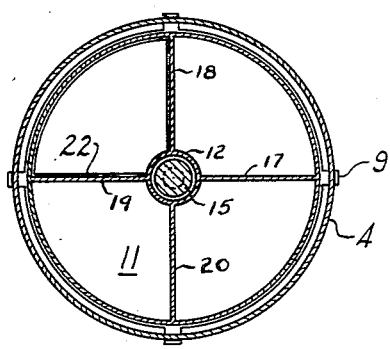
Figure 4 is a similar view taken along the line 4—4, Fig. 1.

The edges of the discs 10 and 11 overlap the annulus 7 as shown in Figure 1 and have sliding contact therewith when the crank 16 is actuated. The space between the discs 10 and 11 is divided by radial partitions 17, 18, 19 and 20 as shown in Figure 4. These partitions extend to the annulus 7 of the hopper 4 to which they are secured and form intermediate compartments, some of which are exposed to the coffee contents of the can 1 by means of the segment-shaped opening 21 on the disc 10. They are similarly exposed to the outlet portion of the hopper 4 by the segment shaped opening 22. When the crank 16 is actuated, the discs 10 and 11 are the only elements that are subjected to angular movement. Consequently, when the crank is in the position shown in Figure 1, the compartment below the opening 21 in the disc is filled with coffee as shown in Figure 2. In that position the compartment above the opening 22 in disc 11 will be discharged through the hopper opening. When the crank 16 is moved to the position 180° from its position in Figure 1, as shown in Figure 3, the compartment beneath the segment-shaped opening 21 will be filled with coffee as indicated in Figure 3 and the segment-shaped opening 22 of disc 11 will be below the compartment which is shown filled in Figure 2 to discharge its contents through the hopper opening. The intermediate compartments may be closed as they have no function in the operation of the dispensing device.

Instead of employing a coffee can in which the coffee is packed and sold, the hopper may be provided with a can integrally formed therewith having a bracket 24, Figure 2, for cooperating with a wall bracket, not shown.

It will be evident from the above description of this invention that by means of the operation of the crank in cooperation with two compartments in the hopper, and by means of the two oppositely disposed segment-shaped openings in the top and bottom disc, the contents of the container 1 is at all times sealed from the atmosphere and a measured amount of coffee is dispensed each time the crank 16 is moved to another position, while at the same time a compartment is being charged with freshly ground coffee from the container 1.

Although one embodiment of the invention has been herein illustrated and described, it will be evident to those skilled in the art that various modifications may be made in the details of construction without departing from the principles herein set forth.

I claim:

A combined closure and dispensing device for vacuum packed coffee comprising a hopper having a seating surface for the open end of a coffee can and means for attaching the same to the edge of the can, said hopper having an annulus spaced from the mouth of the hopper and attached to the side walls thereof, a pair of spaced discs mounted for angular movement on a bolt having a crank movable through an arc of 180°, said discs overlapping the annulus and the space between said discs having fixed angularly spaced partitions dividing the same into measuring compartments, each of said discs having an arcuate shaped opening corresponding substantially to the area of said measuring compartments, the openings of the top and bottom discs being spaced 180° whereby upon rotation of said discs one measuring compartment will be exposed to the source of coffee to charge the same, and another compartment will discharge a measured volume of coffee to the hopper opening.

References Cited in the file of this patent

UNITED STATES PATENTS

| | | |
|---|---|---|
| 1,005,130 | Andrews | Oct. 10, 1911 |
| 2,199,065 | Bell | Apr. 30, 1940 |
| 2,321,869 | Stanyer | June 15, 1943 |
| 2,584,781 | Beatty | Feb. 5, 1952 |

FOREIGN PATENTS

| | | |
|---|---|---|
| 65,899 | Norway | Mar. 8, 1943 |
| 1,026,122 | France | Apr. 23, 1953 |